(12) United States Patent
Li

(10) Patent No.: US 8,941,986 B2
(45) Date of Patent: Jan. 27, 2015

(54) COMPUTER SYSTEM

(75) Inventor: Yang Li, Shenzhen (CN)

(73) Assignee: ScienBizIP Consulting (Shenzhen) Co., Ltd., Guangdong (CN)

( * ) Notice: Subject to any disclaimer, the term of this patent is extended or adjusted under 35 U.S.C. 154(b) by 331 days.

(21) Appl. No.: 13/444,082

(22) Filed: Apr. 11, 2012

(65) Prior Publication Data

US 2013/0003293 A1    Jan. 3, 2013

(30) Foreign Application Priority Data

Jul. 1, 2011   (CN) .......................... 2011 1 0183494

(51) Int. Cl.
G06F 1/20 (2006.01)
G06F 1/18 (2006.01)

(52) U.S. Cl.
CPC . G06F 1/181 (2013.01); G06F 1/20 (2013.01)
USPC ............ 361/679.47; 361/679.46; 361/679.48; 361/679.49; 361/679.5; 361/679.51; 361/679.52; 361/688; 361/690; 361/692; 361/694; 361/695; 361/697; 361/700; 361/704

(58) Field of Classification Search
CPC ........... G06F 1/00; G06F 1/20; H01L 23/427; H01L 23/467; H01L 2023/405; H01L 2023/4056; H05K 7/20136; H05K 7/20154; H05K 7/20163; H05K 7/20336; H05K 7/2039; H05K 2007/20027; H05K 2007/20081; H05K 2007/20527
USPC .................... 361/769.46–769.48, 679.46–48, 361/679.02, 679.49, 679.51–679.56, 361/688–723; 174/15.1–15.2, 16.1–16.3; 257/706–722; 312/223.1–223.3, 236; 438/121–122
See application file for complete search history.

(56) References Cited

U.S. PATENT DOCUMENTS

2007/0091561 A1* 4/2007 Cheng et al. .................. 361/687
2007/0091567 A1* 4/2007 Hayashi ........................ 361/695
2011/0222237 A1* 9/2011 Fujiwara et al. ......... 361/679.48

* cited by examiner

Primary Examiner — Robert J Hoffberg
Assistant Examiner — Mukund G Patel
(74) Attorney, Agent, or Firm — Novak Druce Connolly Bove + Quigg LLP

(57) ABSTRACT

A computer system includes a computer case, an enclosure, and a heat dissipating device. The computer case includes a rear plate with a plurality of ventilation holes. The enclosure includes a separating portion to divide the computer case into a first receiving area and a second area. The heat dissipating device includes a first heat sink, a second heat sink, a heat pipe and a fan. The first heat sink is attached to a chip, and the fan communicates with the second heat sink. The first heat sink and the fan are received in the first receiving area, and the second heat sink is received in the second receiving area. The heat pipe extends through the separating portion, and the plurality of ventilation holes, the first heat sink, the fan, the heat pipe, and the second heat sink together defines an air path for air flowing through.

15 Claims, 3 Drawing Sheets

COMPUTER SYSTEM

BACKGROUND

1. Technical Field

The present disclosure relates to computer systems, more particularly to a computer system with a heat dissipating apparatus.

2. Description of Related Art

Heat dissipating devices perform the critical function of removing heat from a computer system. For example, a plurality of fans is provided to efficiently dissipate heat. Air is directed out of the computer system by the fans, for dissipating heat generated in the computer system. However, if the air flows in a disorderly manner in the computer system, heat dissipating efficiency of the computer system will decrease.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" exemplary embodiment in this disclosure are not necessarily to the same exemplary embodiment, and such references mean at least one.

Figure 1:
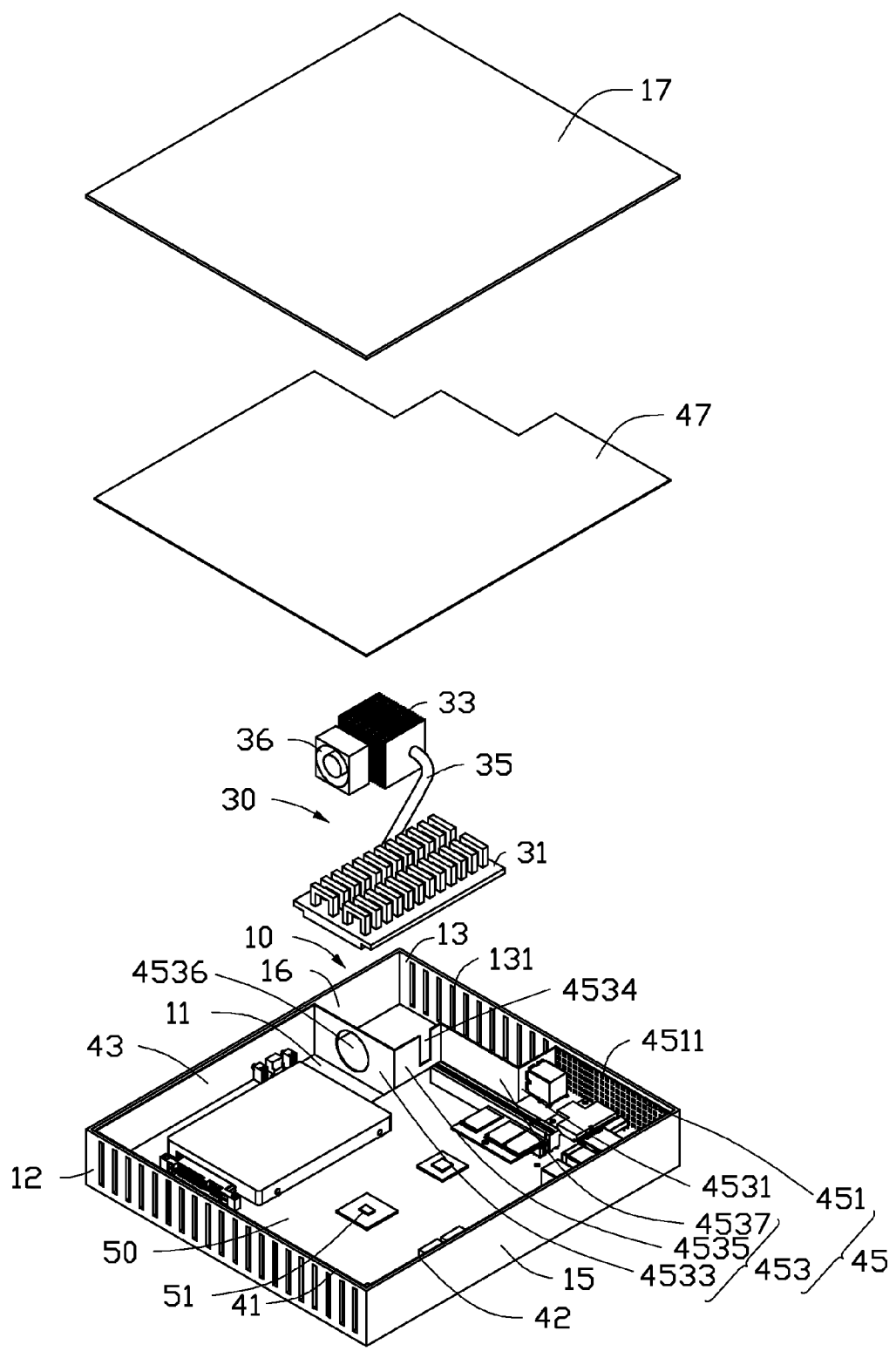
FIG. 1 is an exploded, isometric view of a computer system in accordance with an embodiment.
Figure 2:
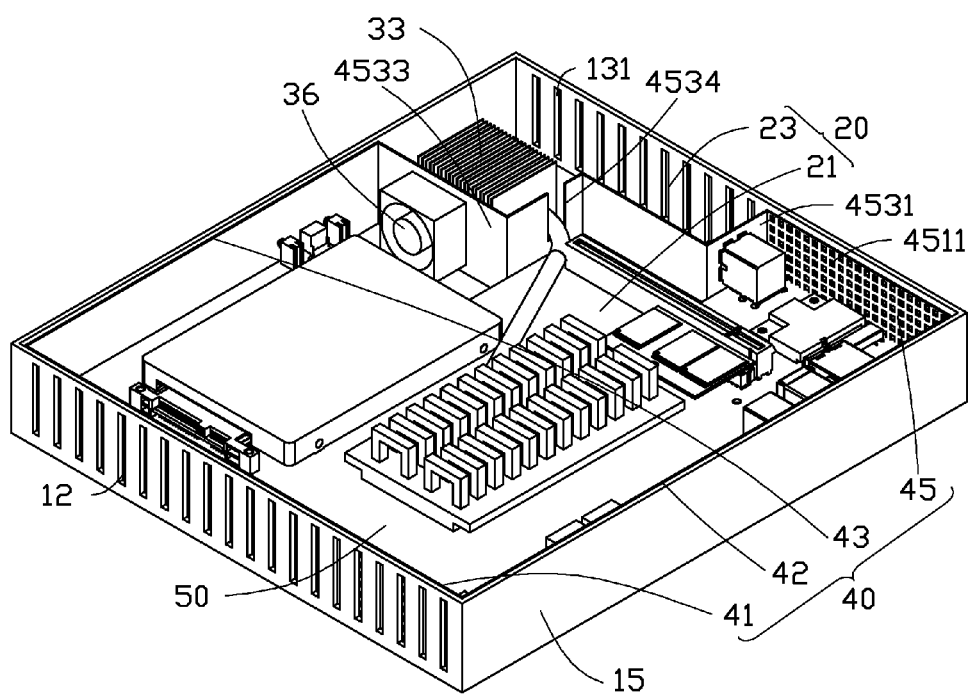
FIG. 2 is similar to FIG. 1, showing a heat dissipating device secured to a computer case.

Referring to FIGS. 1 and 2, a computer system in accordance with an exemplary embodiment includes a computer case 10 and a heat dissipating device 30 received in the computer case 10.

The computer case 10 includes a bottom plate 11, a front plate 12, a rear plate 13, a first side plate 15, a second side plate 16, and a cover 17. The rear plate 13 defines a plurality of ventilation holes 131. In one embodiment, the front plate 12 is substantially parallel to the rear plate 13, and substantially perpendicular to the bottom plate 11. In one embodiment, the computer case 10 can have various configurations, such as different wall or base configurations so long as the computer case 10 is adapted to couple with the cover 17 to create a housing 20.

An enclosure 40 is received in the housing 20 and includes a front panel 41, a first side panel 42, a second side panel 43, a rear panel 45, and a cover 47. In one embodiment, the front panel 41 is attached to the front plate 12, the first side panel 42 is attached to the first side plate 15, and the second side panel 43 is attached to the second side plate 16.

The rear panel 45 includes an airflow portion 451 and a separating portion 453 located between the airflow portion 451 and the second side panel 43. The airflow portion 451 defines a plurality of through holes 4511 communicating with the plurality of ventilation holes 131. The housing 20 is separated into a first receiving area 21 and a second receiving area 23 by the separating portion 453. The separating portion 453 includes a first connecting portion 4531, an air through portion 4533, a mounting portion 4535, and a second connecting portion 4537 located between the mounting portion 4535 and the first connecting portion 4531. The air through portion 4533 is connected to the second side panel 43 and defines an opening 4536. The mounting portion 4535 is located between the air through portion 4533 and the second connecting portion 4537, and a positioning slot 4534 is defined in the mounting portion 4535. In one embodiment, the first connecting portion 4531 is substantially perpendicular to the airflow portion 451 and the second connecting portion 4537, and substantially parallel to the mounting portion 4535. The air through portion 4533 is substantially perpendicular to the mounting portion 4535, and substantially parallel to the second connecting portion 4537.

A motherboard 50 is attached to the bottom plate 11 and located in the first receiving area 21. The motherboard 50 can also include various components that are typically in a computing device. For example, a chip 51 is mounted to the motherboard 50.

The heat dissipating device 30 includes a first heat sink 31, a second heat sink 33, a heat pipe 35 located between the first heat sink 31 and the second heat sink 33, and a fan 36.

Figure 3:
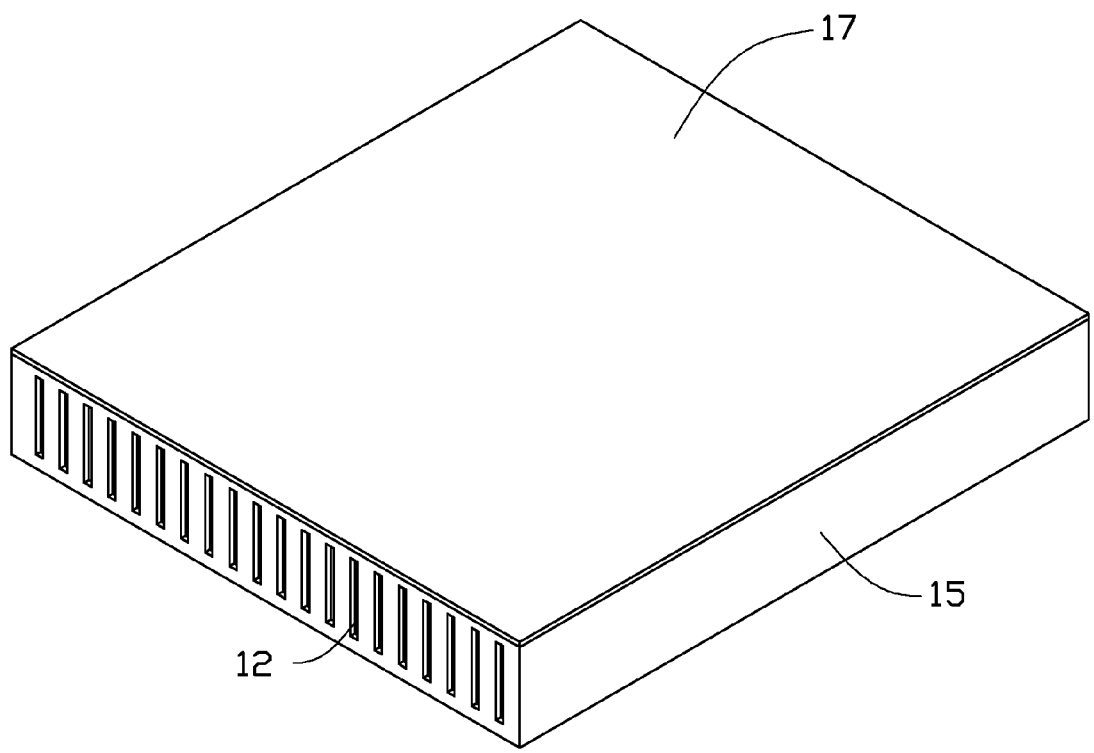
FIG. 3 is an assembled view of FIG. 1.

Referring to FIGS. 2-3, in assembly, the first heat sink 31 is secured to the motherboard 50 and above the chip 51 with fasteners. The fasteners can be a screw with a corresponding washer or other appropriate means for coupling one element to another element. The heat pipe 35 is positioned in the positioning slot 4534, and the second heat sink 33 is located in the second receiving area 23. In one embodiment, a gap is defined between the second heat sink 33 and the bottom plate 11. The fan 36 can be secured to the air through portion 4533 by means of screw or jointing. The second heat sink 33 is adjacent to the air through portion 4533 and the mounting portion 4535. The cover 47 is covered on the enclosure 40. The cover 17 is covered on the computer case 10.

In use, the chip 51 will generate heat. The heat from the chip 51 is transferred to the first heat sink 31, and transferred to the second heat sink 33 by the heat pipe 35. Air from the outside of the computer case 10 flows into the housing 20 via the plurality of ventilation holes 131. In one embodiment, a first part of the air flows into the first receiving area 21 via the plurality of ventilation holes 131 and the plurality of through holes 4511, and a second part of the air flows into the second receiving area 23 via the plurality of ventilation holes 131. The fan 36 works, the first part of the air flows through the first heat sink 31, out of the first receiving area 21, and further flows through the second heat sink 33. Then, the first part of the air flows out of the computer case 10 via the plurality of ventilation holes 131. The second part of the air flows through the second heat sink 33 via the plurality of ventilation holes 131. Thus, the heat generated from the chip 51 can be effectively removed.

It is to be understood, however, that even though numerous characteristics and advantages have been set forth in the foregoing description of exemplary embodiments, together with details of the structures and functions of the exemplary embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer system comprising:
   a computer case comprising a rear plate and a side plate; and the rear plate defines a plurality of ventilation holes, and a chip is located in the computer case;

an enclosure, located in the computer case, comprising a first side panel, a second side panel that is opposite to the first side panel, and a separating portion located between the rear plate and the side plate, a length of the first side panel being greater than that of the second side panel, and the separating portion divides the computer case into a first receiving area and a second receiving area;

a heat dissipating device comprising a first heat sink, a second heat sink, a heat pipe connected to the first heat sink and the second heat sink, and a fan; and the first heat sink is attached to the chip, and the fan communicates with the second heat sink and is attached to a first side of the separating portion;

wherein the first heat sink and the fan are together received in the first receiving area, the heat pipe extends through the separating portion, and the second heat sink is received in the second receiving area and abuts a second opposite side of the separating portion.

2. The computer system of claim 1, wherein the enclosure comprises a rear panel, the rear panel comprises an airflow portion that is substantially perpendicular to the separating portion, the airflow portion abuts the rear plate and defines a plurality of through holes, and the plurality of through holes communicates with the plurality of ventilation holes.

3. The computer system of claim 2, wherein the separating portion further comprises an air though portion that is substantially perpendicular to the side plate, and the air through portion is secured to the fan and defines an opening communicating with the fan.

4. The computer system of claim 3, wherein the separating portion further comprises a mounting portion substantially perpendicular to the air through portion, and the mounting portion defines a positioning slot to receive the heat pipe.

5. The computer system of claim 4, wherein the separating portion further comprises a first connecting portion and a second connecting portion, the first connecting portion is perpendicularly connected to the airflow portion, and the second connecting portion is located between the first connecting portion and the mounting portion.

6. The computer system of claim 1, wherein the computer case further comprises a bottom plate that is substantially perpendicular to the rear plate, and a gap is defined between the second heat sink and the bottom plate.

7. A computer system comprising:

a computer case comprising a rear plate, a front plate opposite to the rear plate, a first side plate and a second side plate opposite to the first side plate; the rear plate defining a plurality of ventilation holes, and a chip is located in the computer case;

an enclosure, located in the computer case, comprising a front panel abutting against the front plate, a first side panel abutting against the first side plate, a second side panel abutting against the second side plate, and a rear panel; the rear panel comprising an airflow portion abutting against the rear plate and a separating portion connected to the airflow portion, the separating portion divides the computer case into a first receiving area and a second receiving area;

a heat dissipating device comprising a first heat sink, a second heat sink, a heat pipe connected to the first heat sink and the second heat sink, and a fan; and the first heat sink is attached to the chip, the fan communicates with the second heat sink; the first heat sink and the fan is together received in the first receiving area, and the second heat sink is received in the second receiving area;

wherein the heat pipe extends through the separating portion, and the plurality of ventilation holes, the first heat sink, the fan, the heat pipe, and the second heat sink together defines an air path for air flowing through.

8. The computer system of claim 7, further comprising the fan abuts a first side of the separating portion, and the second heat sink abuts a second opposite side of the separating portion.

9. The computer system of claim 7, wherein the separating portion is locate between the side plate and the rear plate.

10. The computer system of claim 7, wherein the airflow portion is substantially perpendicular to the separating portion, the airflow portion defines a plurality of through holes, and the plurality of through holes communicates with the plurality of ventilation holes.

11. The computer system of claim 10, wherein the separating portion further comprises an air though portion that is substantially perpendicular to the side plate, and the air through portion is secured to the fan and defines an opening communicating with the fan.

12. The computer system of claim 7, wherein a length of the first side panel is greater than that of the second side panel.

13. The computer system of claim 11, wherein the separating portion further comprises a mounting portion substantially perpendicular to the air through portion, and the mounting portion defines a positioning slot to receive the heat pipe.

14. The computer system of claim 13, wherein the separating portion further comprises a first connecting portion and a second connecting portion, the first connecting portion is perpendicularly connected to the airflow portion, and the second connecting portion is located between the first connecting portion and the mounting portion.

15. The computer system of claim 7, wherein the computer case further comprises a bottom plate that is substantially perpendicular to the rear plate, and a gap is defined between the second heat sink and the bottom plate.

* * * * *